Sept. 8, 1931.  L. E. WEBSTER  1,822,761
SPLIT-D HANDLE FOR SHOVELS AND OTHER IMPLEMENTS
Original Filed Dec. 4, 1928   4 Sheets-Sheet 1
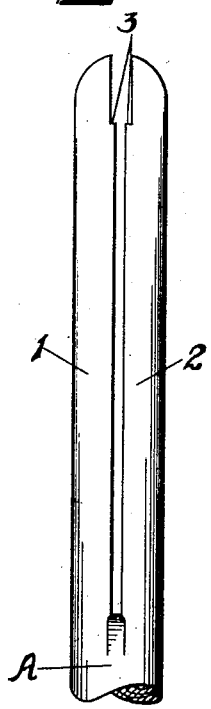
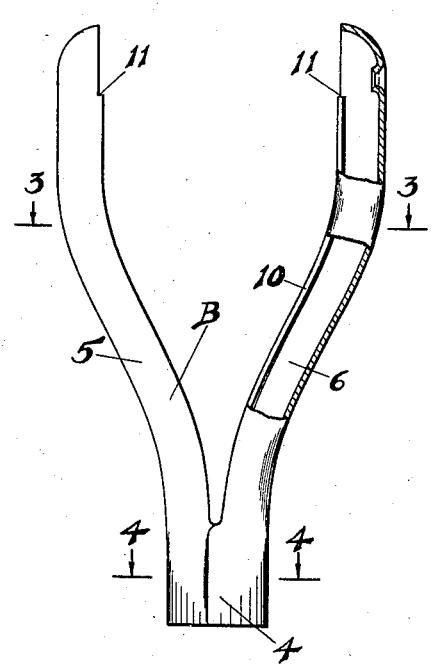
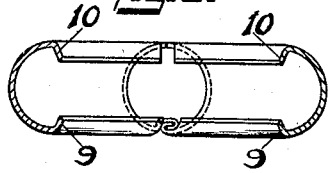
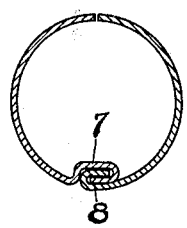
Inventor
Lewis Edmund Webster
By his Attorneys Sept. 8, 1931.  L. E. WEBSTER  1,822,761
SPLIT-D HANDLE FOR SHOVELS AND OTHER IMPLEMENTS
Original Filed Dec. 4, 1928  4 Sheets-Sheet 2
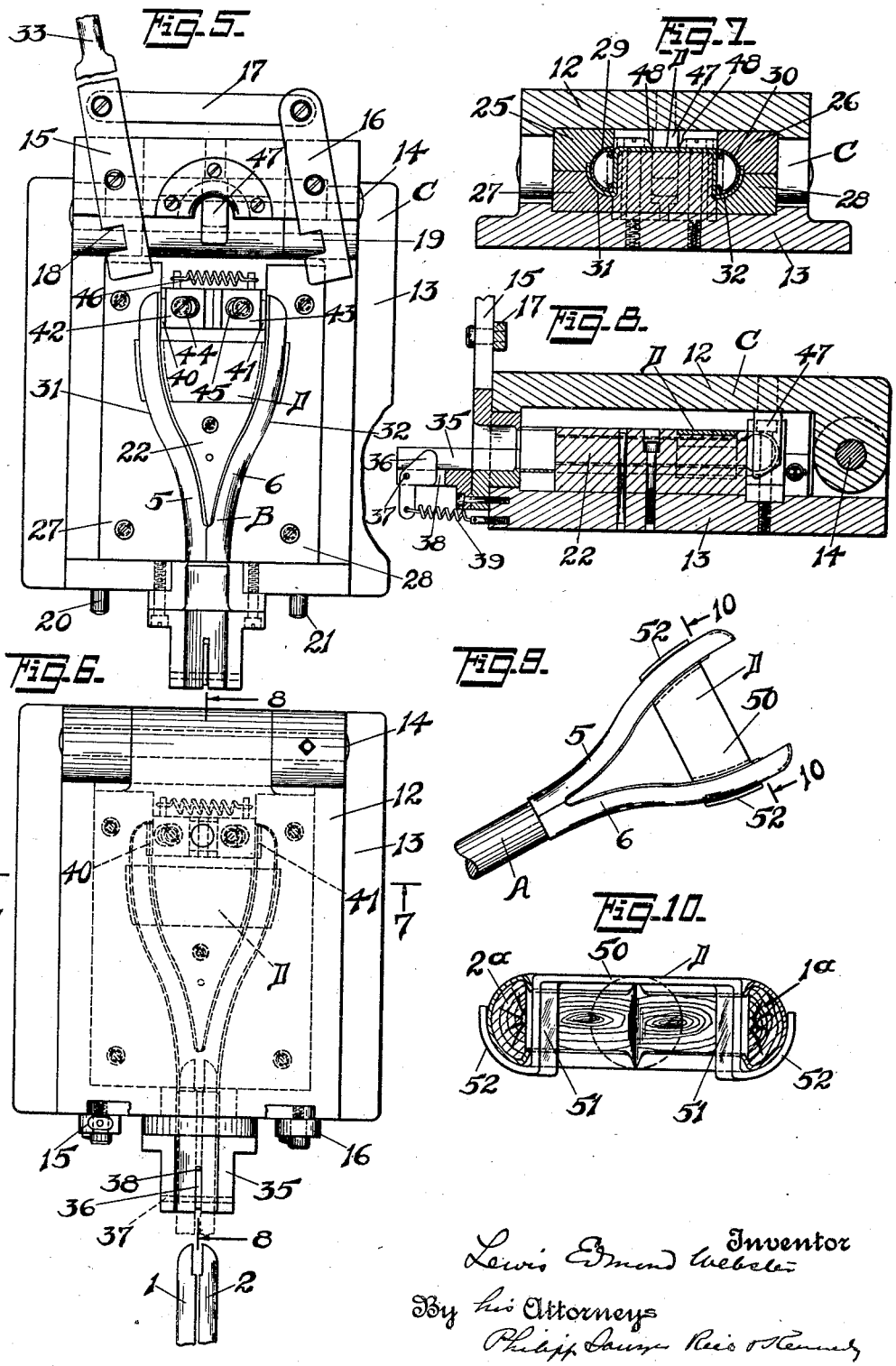

Sept. 8, 1931.   L. E. WEBSTER   1,822,761
SPLIT-D HANDLE FOR SHOVELS AND OTHER IMPLEMENTS
Original Filed Dec. 4, 1928   4 Sheets-Sheet 3
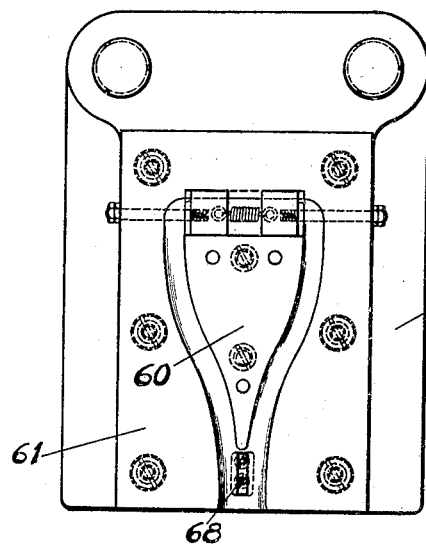
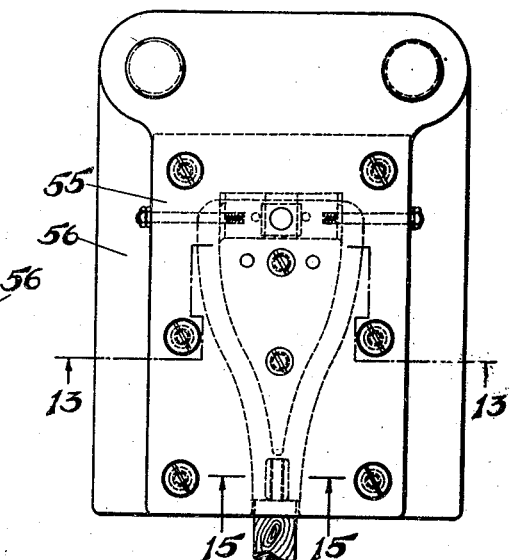
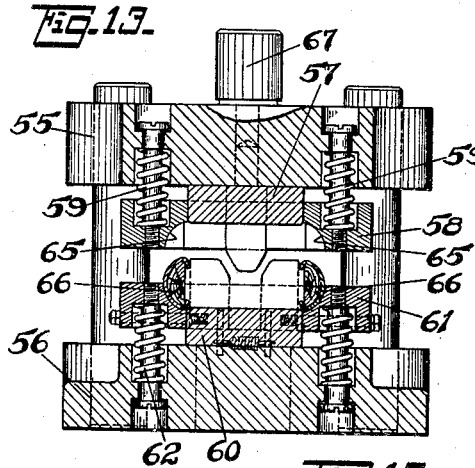
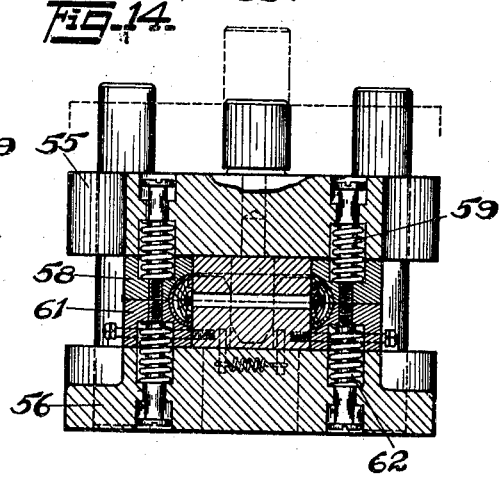
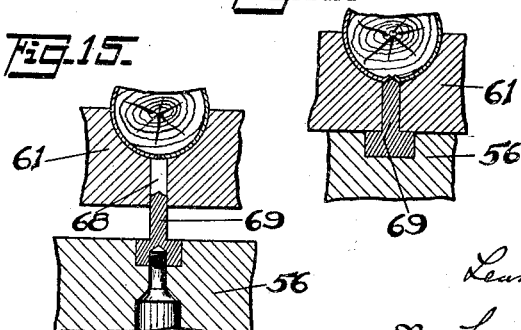
Inventor
Lewis Edmund Webster
By his Attorneys Sept. 8, 1931.    L. E. WEBSTER    1,822,761
SPLIT-D HANDLE FOR SHOVELS AND OTHER IMPLEMENTS
Original Filed Dec. 4, 1928    4 Sheets-Sheet 4
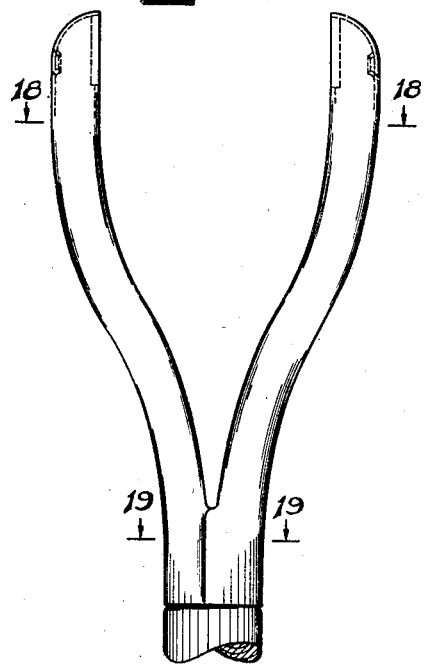
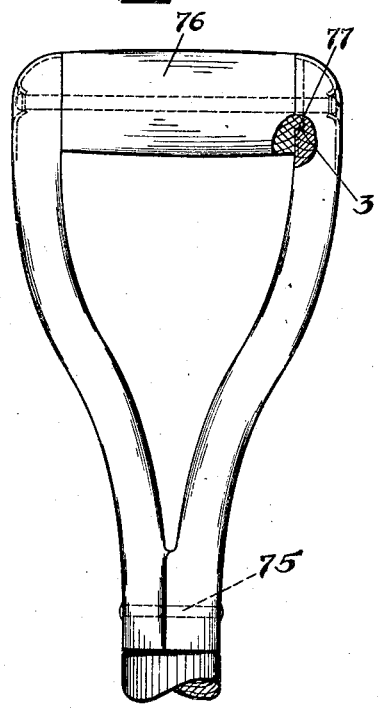
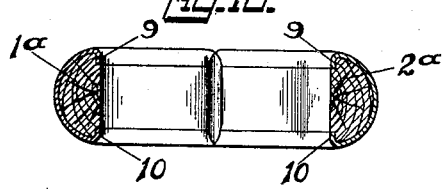
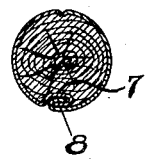

Patented Sept. 8, 1931

1,822,761

UNITED STATES PATENT OFFICE

LEWIS EDMOND WEBSTER, OF WILKES-BARRE, PENNSYLVANIA

SPLIT-D HANDLE FOR SHOVELS AND OTHER IMPLEMENTS

Original application filed December 4, 1928, Serial No. 323,630. Divided and this application filed November 23, 1929. Serial No. 409,235.

This invention relates to improvements in split-D wooden handles for shovels and other implements, that is to say, implement handles made from wooden stems split or sawed longitudinally at one end to provide bifurcated arms which are then spread apart and suitably shaped to receive a hand grip between their outer ends and to provide an opening between the grip and the body of the stem of sufficient width and length for conveniently and comfortably receiving the hand of the user.

This application is a division of my application Ser. No. 323,630, filed December 4, 1928, for method of making split D handles and other implements, in which is claimed the method herein described. The apparatus herein described is claimed in my application Ser. No. 498,613, filed November 28, 1930.

The method now generally in use for the production of such split-D wooden handles includes the following steps: A stem, square in cross-section, and of green or unseasoned wood, is turned accurately to size, rounded and saw-cut longitudinally at one end to provide the arms which are to be spread apart and shaped to receive the hand grip, and this end is then steamed to further soften it. Green or unseasoned wood is necessarily used and the stem is thus further softened to avoid as far as possible breaking and splitting of the stem or its saw-cut end during the arm spreading and shaping operation.

The saw-cut end of the stem is then forced, by means of a "bull-dozer", into a clamp in which its arms are spread apart and shaped to receive between their outer ends the hand grip. The clamp used for this purpose consists of an inner mandrel or form member which enters the saw-cut slot and spreads the arms apart, and a casting consisting of two outer members which engage the outer faces of the arms and limit the separation or spreading thereof by the mandrel and also assist in otherwise shaping the arms; the space between the mandrel and the inner faces or walls of this casing being equal to the thickness of the softened arms laterally.

The stem, still with the spreading and shaping clamp on the end thereof, is then taken to a hot room where it remains for about two days, for the purpose of partially drying the arms of the stem and setting them as to shape. Then the clamp is removed from the stem and a rivet is passed through the stem below and transversely to the saw-cut (with washers interposed between the rivet heads and the surface of the stem) to prevent splitting of the stem longitudinally beyond the saw-cut during the subsequent operations of applying the hand grip, etc.

Ferrules or caps are then applied to the outside of the arms opposite the grip-receiving ends thereof and the hand grip is then placed between these ends of the arms and secured thereby a rivet passing through these ferrules or caps and the arms and grip; these ferrules or caps sometimes having downward extensions along the outside of the arms for a short distance.

The handles thus formed are then laid in a kiln or other suitable place for seasoning or hardening for about six months, at the end of which time they are inspected, and, on such inspection, those which are apparently suitable for marketing purposes are laid aside for the further operations of sand-belting, painting, etc., while those which are unsuitable for marketing are discarded.

The number so discarded after seasoning or drying has run as high as 25% of those placed in the kiln, this being due, among other things, to the breaking or splintering of the stems, as well as to distortion of the caps, ferrules or other metal parts, during the six months' drying period.

In the case of those accepted as apparently suitable for marketing the rivets, caps, ferrules and other metal parts become loosened and the burred ends of the rivets exposed, because of shrinkage of the stems during the kiln-drying, so that the handles require re-tightening of these parts. This re-tightening operation materially increases the cost of manufacturing the handles and because of the dried condition of the handles when they are taken from the kilns, it has to be very carefully performed to avoid breakage of the handles. Notwithstanding such care, however, breakage of the handles frequently occurs, with a further loss of handles running as high as 10%.

To these objections to this method of manufacturing split-D handles I may add, first, that the long storage of the stems or handles for the drying or seasoning thereof represents a very large amount of invested capital which is tied up or "frozen", or, in other words, cannot be used for other purposes, and from which there is no return, second, that the loss of handles during the seasoning or drying period and during the operation of retightening rivets &c. represents a waste of lumber which is very serious particularly where ash (or the preferred northern ash) is used, the supply of such wood decreasing yearly, and third, that split-D wooden handles made according to this method are open to the objection that the arms thereof are very liable to and frequently do break in use, as for example, when thrown on the ground or otherwise carelessly treated by the user, this being true also as to split-D wooden handles generally, whatever method may have been employed in their manufacture.

The present invention provides a handle made according to a handle-manufacturing method which overcomes these objections, as well as others which need not be detailed here.

The handle provided by the present invention is one in which the wooden arms of the handle proper are encased in bendable metal (preferably of pressed steel) extending along and rolled or bent around and into intimate gripping contact with the stem and arms, from a point below the saw cut in the former to the grip receiving ends of the arms.

The method used in making the handle is one in which a metal casing designed to become a permanent part of the handle is also utilized as the means for spreading and shaping the bifurcated ends of the stems to form the handle arms.

According to this method a hollow casing of bendable metal, with diverging arms of split-D shape and preferably in two parts initially (one for each arm), is first mounted securely in a suitable support or forming die. The bifurcated end of a longitudinally sawcut wooden stem, preferably of dried or seasoned wood and softened at its bifurcated end, as by steaming, is then forced endwise into this casing by a "bull-dozer", and the casing (together with the stem which has been forced into it) is then removed from its support and placed in a kiln or other suitable place for drying. After this the metal of the casing is rolled or bent around and into intimate, gripping contact with the stem and arms, the hand grip being then inserted between the outer ends of the latter, as by riveting.

The method thus generally described includes other steps which will be later referred to, and, among them, that of applying a retaining clamp to the two arms of the casing prior to the forcing into them of the bifurcated end of the stem and continuing it there during the drying of the handle; the function of this clamp being to prevent spreading and distortion of the casing and the wooden arms of the stem during the drying operation and before the bending or rolling operations aforesaid.

As a result of the improvements constituting the present invention there is provided, first, a split-D wooden handle which is much stronger and more durable than prior handles of this type and which will better withstand the rough and careless handling to which such handles are frequently subjected in use.

In the accompanying drawings—

Figure 1 is a front view of the bifurcated end of a wooden stem suitable for use in the production of my improved handle.

Figure 2 is a front view (partly broken away) of a tubular metal casing for shaping branches of the bifurcated end of the stem and for permanent application to it in accordance with the present invention, this casing having a split hub portion for engaging the stem below its saw-cut and flanged arms extending therefrom for spreading and shaping the branches of the stem.

Figures 3 and 4 are cross-sections of Figure 2, on the line 3—3 and 4—4 respectively.

Figure 5 is a plan view of a forming die mechanism comprising upper and lower hinged die holders between which the metal casing for the handle is held while the bifurcated end of the handle stem is pushed into it, the upper die holder being shown as open and the lower one with the handle casing resting upon it and ready, on the closing of the die, for receiving the bifurcated end of the stem.

Figure 6 is a plan view of the forming die mechanism closed and locked and ready for the forcing of the bifurcated end of the stem into the casing.

Figure 7 is a cross section of the forming die mechanism on the line 7—7 of Figure 6.

Figure 8 is a longitudinal section thereof on the line 8—8 of Figure 6.

Figure 9 is a view of the stem handle with its metal casing in the condition in which it leaves the forming die mechanism for drying and subsequent operations.

Figure 10 is a cross-section thereof on the line 10—10 of Figure 9.

Figure 11 is a plan view of a two-part die mechanism in which the handle with its metal casing is placed after drying and in which the metal of the casing is rolled or bent around and into intimate gripping contact with the wooden arms of the handle and with the stem proper for a short distance below the saw-cut in it, the two members of this die mechanism being relatively movable in a vertical direction.

Figure 12 is a similar view showing the die mechanism closed and with a handle between its upper and lower members.

Figure 13 is a cross-section of the die mechanism on the line 13—13 of Figure 12.

Figure 14 is a view similar to Figure 13 but with the upper member of the die moved downwardly toward the lower member.

Figure 15 is a cross-section on the line 15—15 of Figure 12 showing means for drawing and bending the metal casing around and into gripping contact with the stem below its saw-cut.

Figure 16 is a similar view showing this operation completed.

Figure 17 is a front view of the handle after the operations portrayed by Figures 11–16.

Figure 18 and 19 are cross-sections thereof on the lines 18—18 and 19—19 of Figure 17, and Figure 20 is a front view of the handle completed by the riveting thereof to the stem and the riveting of a hand grip at the ends of its arms.

Referring to said drawings, I will first describe my handle manufacturing method and in setting forth the different steps performed describe the handle as its manufacture develops during these steps and will conclude with a description of the completed handle.

As before stated, split-D wooden handles are manufactured from stems generally like the stem A illustrated in Figure 1, these stems being bifurcated longitudinally at one end, by saw-cutting, to provide two branches 1, 2, which are to be spread apart into approximately D-shape to provide for the reception of a hand grip between their outer ends and also to provide a space between them of suitable width for the convenient passage of the hand of the user.

The branches 1, 2, of the stem shown in Figure 1 are milled on their inner faces near their outer or grip-receiving ends to provide shoulders 3 for engaging corresponding shoulders in the ends of the hand grip of the shovel so as to prevent turning movement thereof, as later described.

Also, as before stated, according to present practice the spreading apart and shaping of the two branches 1, 2, of a bifurcated wooden stem is effected by the use of a clamping mechanism and a "bull-dozer" which forces this end of the stem into the clamping mechanism. After this operation the handle, with this clamping mechanism still upon it, is removed to and stored in a kiln or the like for two days or so for partially drying it. The clamping mechanism is then removed, the hand grip, ferrules &c. are then applied, and the handle then stored in a kiln for a long period of time for completely drying the stem, such long drying being necessary because the stem is of green or unseasoned wood.

According to the present invention, however, stems of dried or seasoned wood may be, and preferably are, used in the manufacture of the handle, the use of wood in this condition effecting a very large saving in the cost of manufacturing the handles.

According to my method also the operation of spreading apart the arm-forming branches 1, 2, of the stem into approximately D-shape is effected by the use of a D-shaped casing B (illustrated in Figures 2, 3, and 4 of the drawings) which is designed to become a permanent part of the handle. This casing, which is formed of bendable metal (preferably of pressed steel), has a two-part tubular hub portion 4 for embracing the stem A below its saw-cut, and a pair of diverging tubular arms 5, 6, embracing the arms 1a, 2a, formed from the branches 1, 2, of the stem. Two contiguous edges of the hub are connected by a pair of interlocking flanges 7, 8, its other contiguous edges being unconnected and facing each other, as shown in Figure 4. Each of the tubular arms 5, 6, has a pair of inturned flanges 9, 10, designed to embrace and engage the inner faces of the corresponding arms 1a, 2a, of the stem A. These flanges extend from the base of the saw-cut in the stem A to the grip-receiving ends of the arms 5, 6, where they terminate in shoulders 11, which, when the arms 1, 2, and the casing B are assembled, will be in line with the shoulders 3 on the former.

In the shaping of the branches 1, 2, of the stem A the casing B is placed in a forming die mechanism C illustrated in Figures 5 to 8 and comprising upper and lower die holders 12, 13, hinged at 14, so that the upper holder may be swung upwardly from the lower one as shown in Figure 5 and downwardly upon it as shown in Figures 6–8. Upper die holder 12 is provided with a pair of pivotally mounted latches 15, 16, connected at their upper ends by a link 17 and provided at their lower ends with notches 18, 19, for engagement with pins 20, 21, on the lower die holder 13 so as to lock the two holders 12, 13, together during the operation of spreading apart and shaping the branches 1, 2, of the stem A.

The lower die holder 13 has secured to it on its upper face an upwardly projecting inner forming die 22 equal in length to the distance from hub 4 to the shoulders 11 or the grip-receiving ends of the arms 5, 6, of the casing B, this die 22 conforming widthwise and lengthwise to the shape interiorly of said arms and to the separation between them, so that when the casing is laid upon the lower die holder 13 the side walls of this die 22 will engage the inner faces of the arms 5, 6, or rather the inturned flanges 9, 10, thereof, between the hub 4 and the shoulders 11.

The upper and lower die holders 12, 13, have two pairs of co-acting retaining dies 25, 26, and 27, 28, respectively, and these dies are provided on their inner faces with curved recesses 29, 30, 31, 32, extending longitudinally of the dies and conforming lengthwise and crosswise to and (in the closed position of the members 12, 13) engaging the outer faces of the arms 5, 6, for the full length thereof.

As a result of this construction, when the two die holders 12, 13, of the die are closed and locked together the casing B is rigidly supported against bodily movement in any direction as well as against any movement by either of its arms 5, 6, relatively to each other or in any other direction, during the operation of forcing the bifurcated end of the stem A into and shaping its branches 1, 2, in the casing, which is as follows:

The casing B is placed on the lower die holder 13 of the forming die mechanism with the die 22 between its arms 5, 6, as shown in Figure 5. The upper die holder 12 is then swung downwardly over the die holder 13, as shown in Figures 6, 7, and the latches 15, 16, moved into locking engagement with the pins 20, 21, through a handle 33, provided for such movement of the latches. Then by the use of a "bull-dozer" (see Figure 6) the bifurcated end of a stem A (preferably of seasoned or dried wood, having its bifurcated end softened, as by steaming) is forced into the casing B through a guiding bracket 35 secured to die holder 13 and provided with a guiding dog 36 entering the saw-cut in the end of the stem A so as to properly center or position its bifurcated end with relation to the casing arms 5, 6, which they are to enter, as shown in Figure 6. As best shown in Figure 8, this dog 36 is pivotally mounted at 37 in a slot 38 in the bracket 35 and held yieldingly in its elevated or centering position by a spring 39, the dog being thus mounted so that when the saw-cut in the stem has passed it, it will be swung downwardly out of centering position by the engagement with it of the following part or body of the stem. As the bifurcated end of the stem A is thus forced into the forming die its branches 1, 2, will be forced into and spread apart by the arms 5, 6, as indicated in Figure 10, thus shaping the wooden arms 1a, 2a, of the handle. Upper die member 12 is then raised for the removal of the handle.

Beyond the upper or wide end of the die member 22, or, in other words, in line with the hand grip-receiving ends of the handle thus shaped or formed in the die mechanism C, there are provided two movable abutments 40, 41, adapted to enter the upper ends of the arms 5, 6, and to engage the upper ends of the wooden arms 1a, 2a, on and above the shoulder 3. The purpose of such engagement is to resist and prevent inward or lateral displacement and distortion of these parts of the branches 1, 2, as the latter are forced into the arms 5, 6, of the casing B, which displacement or distortion would interfere with or prevent a proper fit, between the upper ends of the handle, of the hand grip which is to be introduced between them as hereinafter described.

The abutments 40, 41, are carried by blocks 42, 43, movably mounted, by pins and slots 44, 45, in the lower die holder 13 of the die mechanism and are held normally, or in the open position of the holders 12, 13, in retracted and inactive position by a spring 46. They are moved outwardly to active or operative position, when the die mechanism is closed, by a lug 47 carried by the upper die holder 12 and which, engaging cam surface 48 on the inner ends of blocks 42, 43, as said die holder is moved downwardly onto holder 13, spreads these blocks and their abutments 40, 41, outwardly.

The handle thus shaped with the casing B as an integral, permanent part thereof, is then removed from the die mechanism C and dried in a kiln or other suitable place. If seasoned or dried wood be used in forming the handle, as I prefer to do, the time required for this drying operation will be very short and only necessary at all because of the softening of the bifurcated end of the stem preceding the shaping thereof, as before described.

After this drying has been effected the shaped handle is then ready for the other operations, which will presently be described.

Before describing these other operations I should call attention to another important feature of my method, namely, means for preventing spreading or distortion of the handle after leaving the forming die and while in the drying kiln. The means provided for this purpose consists of a clamp D (best shown in Figures 9, 10) having a horizontal bar 50, depending legs 51 for engaging the inner faces or flanges 9, 10, of the casing arms 5, 6, and upwardly extending curved legs 52 engaging the outer faces of said arms. The legs 51 are adapted to fit in vertical recesses in the faces of the die 22, while the legs 52 are adapted to fit in vertical recesses in the curved recesses 29, 30, 31, 32, of the dies 25, 26, 27, 28, as shown in Figure 7, so as to enclose and engage the outer and inner faces of the arms 5, 6, of the casing B.

When the handle is removed from the forming die C, and during the drying of it, the clamp D is retained in position upon it (see Figure 9) and will resist any tendency of the handle to become distorted from shrinkage of the wooden arms 1a, 2a, or any other cause. After such drying and before the final operations of combining the casing B, arms 1a, 2a, and stem A, which will now be described, the clamp D is removed from the casing B.

These final operations include the step of bending or rolling the metal of the casing around and into intimate gripping contact with the wooden arms 1a, 2a, of the stem and the inner faces thereof, as well as with the stem itself for a short distance below its saw-cut, this being desirable in any event and necessary where the bifurcated end of the stem has been softened before the shaping operation, as before described, and in that case because of the shrinking of that end in such case during the drying operation.

A die mechanism is shown in Figures 11 to 16 for the performance of these final operations, comprising upper and lower die holders 55, 56. The upper die holder 55 carries a punch 57 rigidly secured to it and, outside this and enclosing it, a floating die 58, yieldingly mounted in the holder 55 by springs 59. The lower die holder 56 is provided with a punch 60 and a floating die 61 yieldingly mounted in the holder 56 by springs 62. The punch 57 and floating die 58, and the punch 60 and floating die 61, are counterparts of and register with each other as shown in Figures 13 and 14, where the die mechanism is shown in open and closed positions respectively.

The punches 57, 60, which are designed, on the closing of the die mechanism, to enter the space between the arms 5, 6, of the casing B which is to be operated upon, are of slightly greater width than that space so that as they enter it they will bend the flanges 9, 10, of the metal casing downwardly and upwardly respectively, and also inwardly against the inner faces of the wooden arms 1a, 2a, of the stem A, as shown in Figure 14. As in the case of the die 22 of Figures 5–8, these punches extend from the hub 4 of the handle to the shoulders 11 on its arms 5, 6, or, in other words, not into the hand grip-receiving ends of said arms.

The upper and lower floating dies 58, 61, have curved recesses 65, 66, which, on the movement of the die mechanism to closed position, engage the curved outer faces of the handle arms 5. 6, as partly shown in Figure 13 and fully shown in Figure 14 of the drawings.

In the use and operation of this die mechanism the handle of Figure 9 (minus its clamp D) is placed upon the floating die 61 as shown in Figure 13. The upper holder 55, with its punch 57 and floating die 58, is then forced downwardly toward the lower die holder 56 by means of a suitable press (not shown) connected with a stem 67 carried by the die holder 55. As the upper die member is thus moved its floating die 58 will engage floating die 61 of the lower die holder 56 and these dies will be moved to the position in which they are shown in Figure 14, with the handle arms 5, 6, in their recesses 65, 66.

As the die holder 55 is thus moved the punch 57 thereon, and the punch 60 on the lower die holder 56, will enter the space between the arms 5, 6, of the handle and in doing so bend or roll the flanges 9, 10, of said arms downwardly and upwardly, respectively, and also inwardly against and in gripping contact with the inner faces of the wooden arms 1a, 2a, of the handle, the metal casing in this operation being also drawn or stretched around said arms and therefore into intimate contact with the outer faces thereof.

The lower floating die 61 is provided with a slot 68 (Figures 11, 15) with which the free, contiguous edges of the hub 4 of the casing register, as shown in Figure 15, when the handle is placed on the die holder 56. There is also provided a curling tool 69 mounted in the die holder 56, and, as the floating die 61 is moved downwardly from the position shown in Figure 13 to that shown in Figure 14, this curling tool 69, moving upwardly in the recess 68, will engage the hub of the metal casing and bend these free ends of said casing upwardly into the wooden stem below the saw-cut therein, as shown in Figure 16.

The upper die holder 55 is then raised and the handle removed.

The handle thus finished, as to the arms thereof, is shown in Figures 17–19. It is completed by riveting the hub 4 of its metal casing to the stem A (as at 75) below the saw-cut therein, and by connecting a hand grip 76 with the arms 5, 6, as shown in Figure 20. This is done by springing or spreading the arms 5, 6, apart and inserting the grip 76 between them, with the shoulders 77 thereon resting on the shoulders 3 of the wooden arms 1a, 2a, the engagement of these two sets of shoulders preventing turning of the grip in the handle. The handle is then finally finished for the market in the usual way, namely, by sand-belting, painting &c.

The handle thus provided by the present invention has the advantage over previous split-D wooden handles of greater strength and durability and safety under all conditions of use, because of the addition of the casing which not only adds to the strength of the wooden arms 1a, 2a, but presents a smooth surface for the hands of the user and prevents injury to them by splintering or slivering of said arms.

What I claim is:

1. In a D-handle construction, a main stem having diverging side arms, a metal casing embracing the body of the stem and said arms, a grip-piece secured to said casing, said casing forming ferrules for the ends of said grip-piece, said casing having inturned flanges in embedding relation with the side arms.

2. In a split-D handle construction, a main stem having side arms, a metal casing embracing the body of the stem and said arms comprising two symmetrically formed portions secured together at one end and having inturned flanges bent into embedding relation with the material of the side arms, the opposite ends of said portions being rounded to form ferrules, and a grip secured between the ends of the same.

3. A shovel handle comprising a main bifurcated stem providing arms, a handle grip between the arms, a preformed metal casing embracing the body of the stem and having side arms embracing the arms of the stem with inturned flanges bent into embedding relation with the material of the side arms, and ferrule-like ends for protecting the joint between the arms and the grip.

4. A shovel handle comprising a main bifurcated stem providing side arms, a grip secured between said arms, a bifurcated metal casing embracing the body of the stem and also the arms to protect said arms from splintering, said casing having inturned flanges bent into embedding relation with the material of the side arms, and means for securing the grip, arms and casing together.

5. A shovel handle comprising a main bifurcated stem providing side arms, a grip secured between said arms, a bifurcated metal casing embracing the body of the stem and also the arms to protect said arms from splintering, said casing having inturned flanges bent into embedding relation with the material of the side arms, means for securing said grip, arms and casing together, and means for securing said casing to the stem.

6. A D-handle comprising a preformed die-shaped metal casing having a tubular hub portion and arms with inturned flanges, a wood stem embraced by and in close contact with said hub portion and having side arms above said hub portion embraced by and in close contact with the arms and flanges of the casing, the flanges being in embedding relation with the side arms, and a grip fixed between the ends of the arms of the casing.

7. A shovel handle comprising a main bifurcated stem providing side arms, a grip between said arms, means for securing said grip to said arms, a bifurcated metal casing embracing the body of the stem and also the arms to protect said arms from splintering, said casing having inturned flanges bent into embedding relation with the side arms.

In testimony whereof, I have hereunto set my hand.

LEWIS EDMOND WEBSTER.